T. Y. BROWN.
Gun-Wiper.
No. 219,384. Patented Sept. 9, 1879.
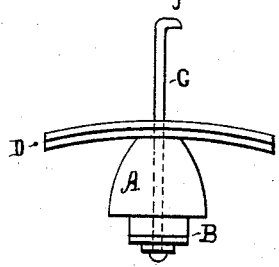
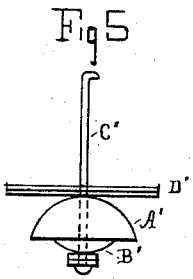
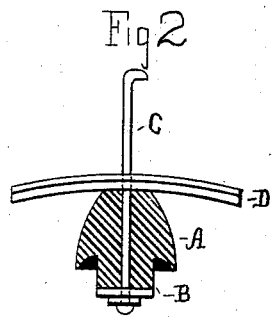
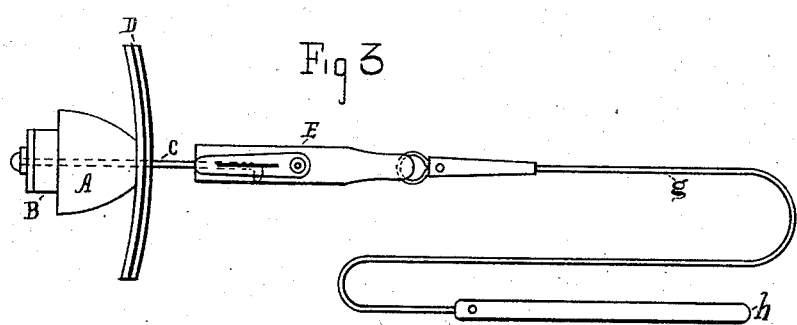
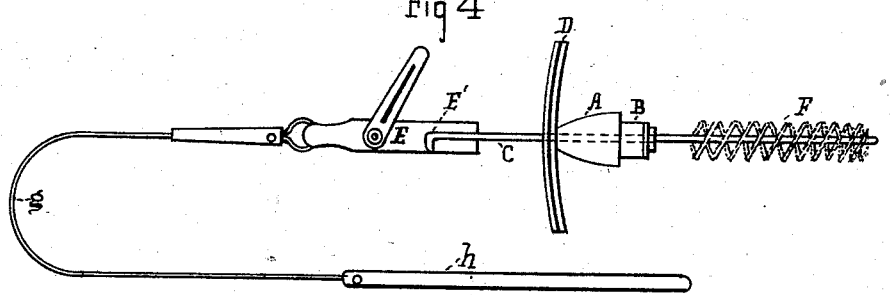
Witnesses
Frank P Kinsey
Frank Hartman
Inventor
T Yardley Brown
Per Thomas P Kinsey
Atty

UNITED STATES PATENT OFFICE.

THOMAS YARDLEY BROWN, OF READING, PENNSYLVANIA.

IMPROVEMENT IN GUN-WIPERS.

Specification forming part of Letters Patent No. 219,384, dated September 9, 1879; application filed July 29, 1879.

*To all whom it may concern:*

Be it known that I, T. YARDLEY BROWN, of the city of Reading, county of Berks, State of Pennsylvania, have invented a new and useful Improvement in Gun Wipers or Cleaners, of which the following is a specification.

The improvement is more particularly related to the gun-wiper Patent No. 214,484, of April 2, 1879, and of the allowed patent of May 28, 1879, severally granted to me; and consists in a change of form in the cone and the attachment of a spiral or scratch brush in the rear of the cone, and connected with the socket-holder E by the wire hook C of the cone A, as shown.

In the specification of my first patent I objected to a solid elastic cone, because it could not crimp or close down on itself, and was therefore not adapted to press equally upon the grooves and lands of the barrel being cleaned, and for that reason I adopted the serrated elastic cone.

I have since then discovered that for certain kinds of arms, more particularly rifle-bore, a more rigid cone is necessary, and after full trial have found the cone shown in Figure 1 to meet every requirement.

It will be noted that the rear of the cone is reduced in size about one-third of the diameter of the base of the cone, and extends out from the base equal in length to its diameter. This neck abuts against the washer, as usual, in my specified patent, and the object of the extension B is to give room for the crimping of the base of the cone A. When I wish to secure more elasticity I undercut the base, as shown in Fig. 2. This makes it very flexible; but I find Fig. 1 to be best adapted for rifled arms.

For the purpose of cleaning very dirty and rusty arms I attach to the socket E' of the cylinder E the hooked holder C, terminating in a spiral scratch-brush of the usual construction. Immediately in advance of the brush I place one of my toad-stool cones, A, and one or more patches, D. Dropping the guard h and cord B through the barrel, and just entering the patch, I pour into the inverted patch oil; then, drawing the patch, cone, and brush through, the oil acts upon the dirt or rust in advance of the brush, and, softening it, the result is the ready removal of the same. A few passes of the brush, Fig. 4, followed up with the cone A and interchangeable patches D of Fig. 3, leaves the barrel in a highly-polished condition.

I do not broadly claim the spiral or any other scratch-brush for the purpose described; but I claim that the combination I have made adds to the completeness of the hunter or soldier's kit, and is a novel and useful improvement.

Fig. 1 is an elevation of the cone A, showing the neck B, as described. Fig. 2 is a view of the cone A in section, showing it as undercut to obtain more elasticity. Fig. 3 is a plan of the gun-wiper complete, showing the cord g, guard h, cylinder E, holder C, cone A, and interchangeable patches D. Fig. 4 is a plan of the gun-wiper complete, with the scratch-brush attachment. Fig. 5 is an elevation of an alternative form of cone somewhat dissimilar to that of Figs. 3 and 4, and will give equally as good results for a short time, but is liable to shred off, and therefore not adapted for long service.

Similar letters refer to similar parts.

Having described my improvement, what I claim is as follows, to wit:

1. The combination of holder C, patches D, and a cone, A, of elastic material, having its rear portion elongated as a cylinder, for the purpose described.

2. The combination of holder C with cone A, patches D, and scratch-brush F, for the purpose shown and described.

THOMAS YARDLEY BROWN.

Witnesses:
 JAMES R. KENNEY,
 AMOS BRINER.